United States Patent
Levine et al.

(10) Patent No.: US 7,496,902 B2
(45) Date of Patent: Feb. 24, 2009

(54) DATA AND INSTRUCTION ADDRESS COMPRESSION

(75) Inventors: Frank Eliot Levine, Austin, TX (US); Aleksandar Milenkovic, Madison, AL (US); Milena Milenkovic, Madison, AL (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 11/083,229

(22) Filed: Mar. 17, 2005

(65) Prior Publication Data

US 2006/0212761 A1    Sep. 21, 2006

(51) Int. Cl.
*G06F 9/44* (2006.01)
(52) U.S. Cl. .................................. 717/128; 714/45
(58) Field of Classification Search .................. 714/45; 717/128
See application file for complete search history.

(56) References Cited

U.S. PATENT DOCUMENTS

| | | | |
|---|---|---|---|
| 2,883,255 A | 4/1959 | Anderson | |
| 3,351,910 A | 11/1967 | Miller et al. | |
| 3,906,454 A | 9/1975 | Martin | |
| 5,608,866 A | 3/1997 | Horikawa | |
| 5,715,387 A | 2/1998 | Barnstijn et al. | 395/183.14 |
| 5,799,322 A | 8/1998 | Mosher, Jr. | 707/202 |
| 5,918,225 A | 6/1999 | White et al. | |
| 5,937,413 A | 8/1999 | Hyun et al. | 707/201 |
| 6,049,798 A | 4/2000 | Bishop et al. | |
| 6,091,712 A | 7/2000 | Pope et al. | |
| 6,148,437 A | 11/2000 | Shah et al. | |
| 6,363,436 B1 | 3/2002 | Hagy et al. | 709/331 |
| 6,507,805 B1 | 1/2003 | Gordon et al. | 702/186 |
| 6,525,322 B2 | 2/2003 | Wong et al. | |
| 6,598,012 B1 | 7/2003 | Berry et al. | 702/187 |
| 6,658,416 B1 | 12/2003 | Hussain et al. | 707/10 |
| 6,678,883 B1 | 1/2004 | Berry et al. | 717/128 |
| 6,691,207 B2 | 2/2004 | Litt et al. | 711/108 |
| 6,708,169 B1 | 3/2004 | Berry et al. | |
| 6,741,952 B2 | 5/2004 | Eidson | 702/187 |
| 6,766,511 B1 | 7/2004 | Berry et al. | 717/128 |
| 6,802,031 B2 | 10/2004 | Floyd et al. | |
| 6,936,822 B2 | 8/2005 | Wong et al. | |
| 6,937,961 B2 | 8/2005 | Cabral et al. | |
| 2002/0121603 A1 | 9/2002 | Wong et al. | |
| 2003/0154028 A1 | 8/2003 | Swaine et al. | 702/1 |
| 2004/0036025 A1 | 2/2004 | Wong et al. | |
| 2004/0158776 A1 | 8/2004 | McCullough et al. | 714/45 |

(Continued)

OTHER PUBLICATIONS

Milenkovic et al.; "Stream-Based Trace Compression"; IEEE; Jan. 2003.*

(Continued)

*Primary Examiner*—Alford W. Kindred
*Assistant Examiner*—Benjamin Geib
(74) *Attorney, Agent, or Firm*—Duke W. Yee; Herman Rodriguez; Gerald H. Glanzman

(57) ABSTRACT

An improved method, apparatus, and computer instructions for compressing trace data. An instruction stream is identified, and in response to identifying the instruction stream, the instruction addresses in the instruction stream are replaced with a stream identifier to form compressed trace data. Data addresses may be related to instructions in the instruction stream to generate a data trace component in the compressed trace data.

9 Claims, 13 Drawing Sheets

U.S. PATENT DOCUMENTS

2005/0210454 A1    9/2005    DeWitt, Jr. et al.
2006/0010352 A1    1/2006    Mukherjee et al.
2006/0215997 A1    9/2006    Kamio et al.

OTHER PUBLICATIONS

Milenkovic, Aleksandar; "Stream-Based Trace Compression"; <http://www.ece-uah/~lacasa/sbc/sbc.html>; Mar. 4, 2004.*

Johnson, Eric; "PDATS II: Improved Compression of Address Traces"; IEEE; Feb. 1999.*

Johnson et al.; "Lossless Trace Compression"; IEEE; Feb. 2001.*

Zhang et al.; "Whole Execution Traces"; IEEE; Dec. 2004.*

IBM Research Disclosure 421134, "Split-Memory Facility for Windows NT(tm)", May 1999, pp. 729-730.

Burtscher et al., "Compressing Extended Program Traces Using Value Predictors", Cornell University, 11 pages.

Fox et al., "Compressing Address Trace Data for Cache Simulations", IEEE 1997, pp. 439.

Johnson et al., "PDATS Lossless Address Trace Compression for Reducing File Size and Access Time", 1994 IEEE International Phoenix Conference on Computers and Communications, pp. 213-219.

Milenkovic et al., "Exploiting Streams in Instruction and Data Address Trace Compression", University of Alabama in Huntsville, 9 pages.

Not Assigned, Levine et al., Event Tracing Using Hash Tables With Support For Dynamic Address To Name Resolution.

Not Assigned, Levine et al., Event Tracing With Time Stamp Compression And History Buffer Based Compression.

Not Assigned, Levine et al., Event Tracing With Time Stamp Compression.

Milenkovic et al., "Exploiting Streams in Instruction and Data Address Trace Compression", Proceedings of IEEE $6^{th}$ Annual Workshop on Workload Characterization, Austin, TX, Oct. 2003, pp. 99-107.

Burtscher et al., "Compressing extended program traces using value predictors", Parallel Architectures and Compilation Techniques, 2003, Proceedings of the $12^{th}$ International Conference on PACT 2003, pp. 159-169.

* cited by examiner

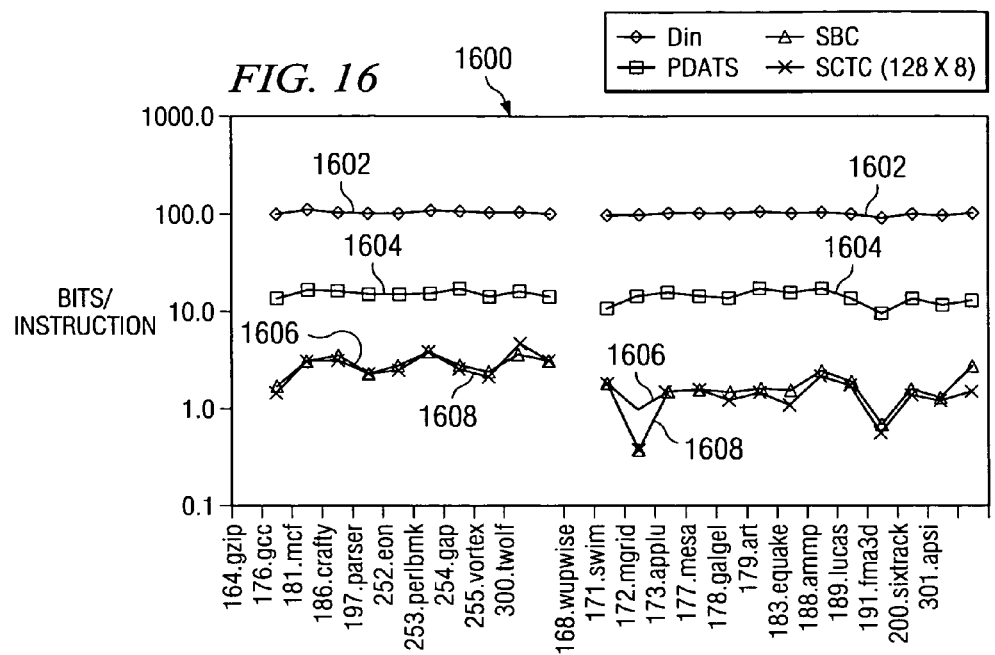
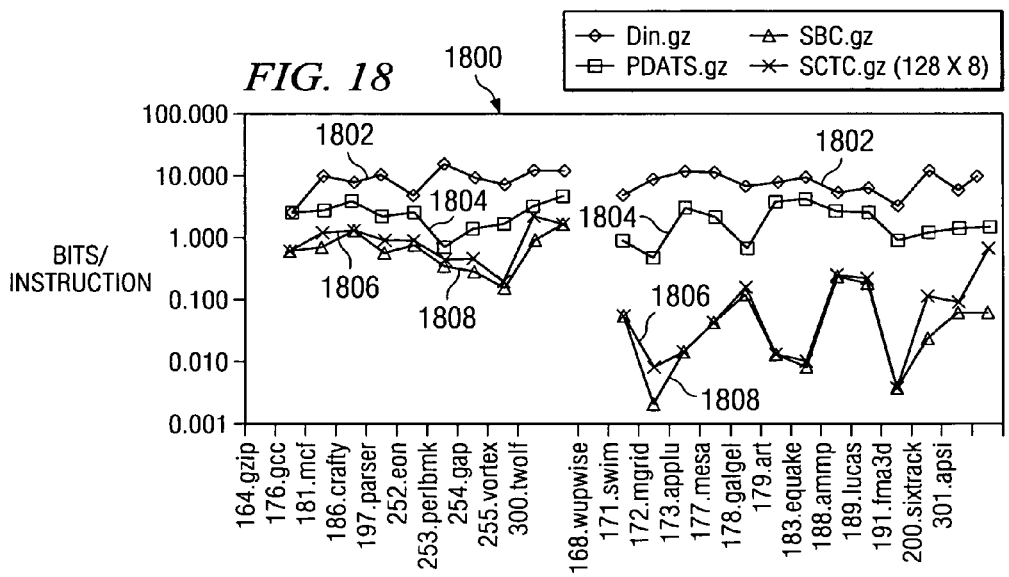

|  | SCTC (64 X 4) | SCTC (32 X 8) | SCTC (128 X 4) | SCTC (64 X 8) | SCTC (256 X 4) | SCTC (128 X 8) |
|---|---|---|---|---|---|---|
|  |  |  |  |  |  |  |
| 164.gzip | 1.50 | 1.50 | 1.57 | 1.56 | 1.64 | 1.64 |
| 176.gcc | 8.97 | 8.74 | 6.33 | 5.99 | 4.58 | 4.32 |
| 181.mcf | 4.27 | 4.58 | 4.62 | 4.38 | 4.52 | 4.52 |
| 168.crafty | 9.44 | 8.43 | 4.95 | 4.26 | 3.28 | 2.89 |
| 197.parser | 3.72 | 3.52 | 3.34 | 3.32 | 3.28 | 3.26 |
| 252.eon | 12.41 | 12.28 | 7.19 | 6.37 | 6.00 | 5.82 |
| 253.perlbmk | 9.96 | 10.15 | 5.85 | 5.78 | 3.76 | 3.39 |
| 254.gap | 3.91 | 3.68 | 3.09 | 2.81 | 2.78 | 2.71 |
| 255.vortex | 13.66 | 13.59 | 10.59 | 10.35 | 7.81 | 7.40 |
| 300.twolf | 7.54 | 7.32 | 4.89 | 4.56 | 4.37 | 4.34 |
|  |  |  |  |  |  |  |
| 168.wupwise | 1.91 | 1.91 | 1.94 | 1.94 | 1.98 | 1.98 |
| 171.swim | 0.95 | 0.95 | 0.96 | 0.96 | 0.96 | 0.96 |
| 172.mgrid | 1.68 | 1.68 | 1.68 | 1.68 | 1.68 | 1.68 |
| 173.applu | 1.82 | 1.82 | 1.82 | 1.82 | 1.82 | 1.82 |
| 177.mesa | 1.70 | 1.24 | 1.30 | 1.24 | 1.30 | 1.30 |
| 178.galgel | 1.48 | 1.48 | 1.52 | 1.52 | 1.57 | 1.57 |
| 179.art | 0.90 | 0.90 | 1.00 | 1.00 | 1.11 | 1.11 |
| 183.equake | 3.82 | 2.79 | 2.74 | 2.69 | 2.78 | 2.70 |
| 188.ammp | 2.44 | 2.23 | 2.17 | 2.08 | 2.08 | 2.05 |
| 189.lucas | 0.43 | 0.43 | 0.45 | 0.45 | 0.47 | 0.47 |
| 191.fma3d | 4.21 | 4.14 | 2.34 | 1.93 | 1.56 | 1.53 |
| 200.sixtrack | 1.83 | 1.73 | 1.48 | 1.43 | 1.32 | 1.26 |
| 301.apsi | 4.11 | 3.94 | 3.59 | 3.57 | 1.64 | 1.64 |

*FIG. 17*

DATA AND INSTRUCTION ADDRESS COMPRESSION

The U.S. Government has a paid-up license in this invention and the right in limited circumstances to require the patent owner to license others on reasonable terms as provided for by the terms of contract number NBCH30390004 awarded by PERCS.

CROSS REFERENCE TO RELATED APPLICATIONS

The present invention is related to the following applications entitled: Event Tracing with Time Stamp Compression and History Buffer Based Compression, Ser. No. 11/083,228, filed Mar. 17, 2005, entitled: Event Tracing Using Hash Tables with Support for Dynamic Address to Name Resolution, Ser. No. 11/083,248, filed Mar. 17, 2005, and entitled: Event Tracing With Time Stamp Compression, Ser. No. 11/083,333, filed Mar. 17, 2005, assigned to the same assignee, and incorporated herein by reference.

BACKGROUND OF THE INVENTION

1. Technical Field

The present invention relates generally to an improved data processing system. In particular, the present invention provides a method and apparatus for obtaining performance data in a data processing system. Still more particularly, the present invention provides a method and apparatus for hardware assistance to software tools in obtaining performance data in a data processing system.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time.

Instruction and data address traces are invaluable for workload characterization, evaluation of new architectures, program optimizations, and performance tuning. Two major trace issues are trace collection and storage. Although some current and emerging architecture include hardware support for trace collection, trace compression in hardware is nonexistent or rudimentary. For example, one of the Advanced RISC Machines (ARM) processor cores includes a trace module for tracing the complete pipeline information, and there is an ARM emulator that compresses these traces by replacing the sequence of the same records by their repetition count.

Currently, the simplest way to reduce the size of an address trace is to replace an address with the offset from the last address of the same type, such as instruction reference, data read, or data write reference. The Packed Differential Address and Time Stamp (PDATS) algorithm takes this approach one step further. PDATS also stores address offsets between successive references of the same type, but the records in the trace of offsets can have variable lengths, specified in a one-byte record header, and an optional repetition count. The compression overhead is very small, but because the underlying structure of the executed program is not taken into account, the achieved compression is modest.

Information about the data addresses may be linked to a corresponding loop, but this approach requires two passes through the trace or code instrumentation. Another currently available approach is to link information about data addresses to an instruction block. One such technique records possible data offsets and numbers of repetitions for each memory referencing instruction in an instruction block. This technique may have very large memory requirements because information about all possible data address offsets for one load or store instruction is kept in a linked list. Hence, it is not suitable for hardware implementation. Our previous approach, stream-based compression (SBC) uses a first-in-first-out (FIFO) buffer of limited size for data address compression, but keeps information about all instruction streams in an unbounded stream table. Because the size of this table is application dependent, this algorithm is also not suitable for hardware implementation.

The size of the structures used for compression can be limited if the compression technique employs a cache-like table for storage. One such solution is implemented, but it keeps only last data address together with the corresponding memory referencing instruction, so the compression of data addresses is achieved only when the last address is repeated.

Therefore, it would be advantageous to have an improved method, apparatus, and computer instructions for compressing data in traces.

SUMMARY OF THE INVENTION

The present invention provides an improved method, apparatus, and computer instructions for compressing trace data. An instruction stream is identified, and, in response, the instruction addresses in the instruction stream are replaced with a stream identifier to form compressed trace data. Data addresses may be related to instructions in the instruction stream to generate a data trace component in the compressed trace data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 16 is a diagram depicting a comparison of instruction traces in accordance with a preferred embodiment of the present invention;

FIG. 17 is a table illustrating a number of bits per instruction for different sizes of stream caches in accordance with a preferred embodiment of the present invention; and FIG. 18 is a diagram illustrating trace data sizes in accordance with a preferred embodiment of the present invention.

DETAILED DESCRIPTION OF THE PREFERRED EMBODIMENT

Figure 1:
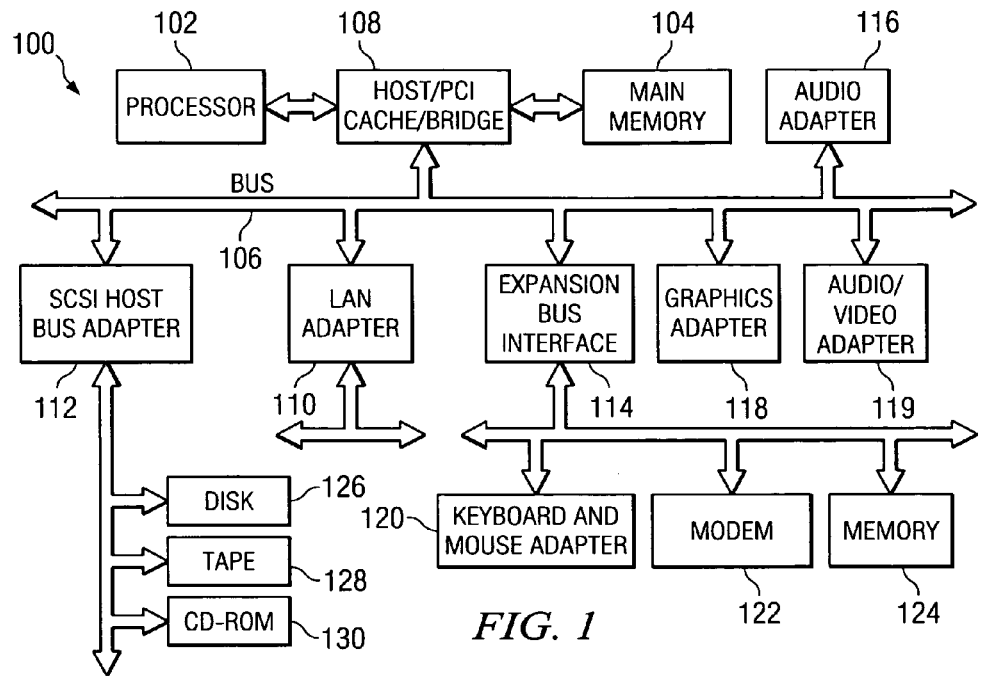
FIG. 1 is a block diagram of a data processing system in which the present invention may be implemented.

With reference now to the figures, FIG. 1 is a block diagram of a data processing system in which the present invention may be implemented. Data processing system 100 is a code or instructions that implement the processes of the present invention. Data processing system 100 employs a peripheral component interconnect (PCI) local bus architecture. Although the depicted example employs a PCI bus, other bus architectures, such as Accelerated Graphics Port (AGP) and Industry Standard Architecture (ISA), may be used. Processor 102 and main memory 104 connect to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, small computer system interface SCSI host bus adapter 112, and expansion bus interface 114 connect to PCI local bus 106 by direct component connection. In contrast, audio adapter 116, graphics adapter 118, and audio/video adapter 119 connect to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 coordinates and provides control of various components within data processing system 100 in FIG. 1. The operating system may be a commercially available operating system such as Windows XP™, which is available from Microsoft Corporation. An object oriented programming system, such as Java™, may run in conjunction with the operating system and provides calls to the operating system from Java programs or applications executing on data processing system 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, data processing system 100 may be a stand-alone system configured to be bootable without relying on a network communication interface, regardless of whether data processing system 100 includes a network communication interface. As a further example, data processing system 100 may be a personal digital assistant (PDA) configured with ROM and/or flash ROM to provide nonvolatile memory for storing operating system files and/or user-generated data. The depicted example in FIG. 1 and above-described examples are not meant to imply architectural limitations.

Processor 102 performs the processes of the present invention using computer implemented instructions located in a memory such as, for example, main memory 104, memory 124, or in one or more peripheral devices 126-130.

Figure 2:
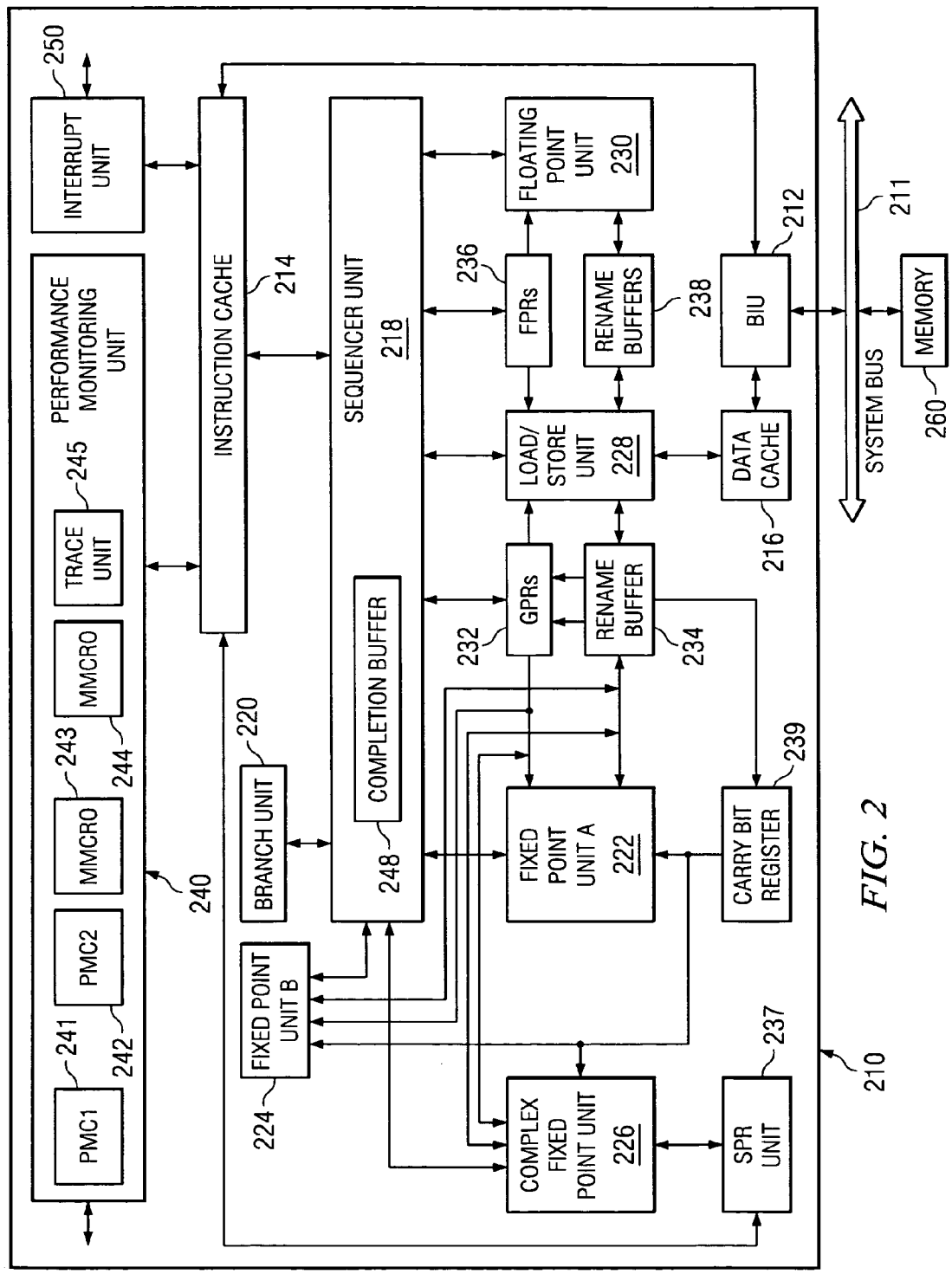
FIG. 2 is a block diagram of a processor system for processing information in accordance with a preferred embodiment of the present invention.

Next FIG. 2 depicts a block diagram of a processor system for processing information in accordance with a preferred embodiment of the present invention. Processor 210 may be implemented as processor 102 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer ("RISC") techniques. As shown in FIG. 2, system bus 211 connects to a bus interface unit ("BIU") 212 of processor 210. BIU 212 controls the transfer of information between processor 210 and system bus 211.

BIU 212 connects to instruction cache 214 and data cache 216 of processor 210. Instruction cache 214 outputs instructions to sequencer unit 218 and sequencer unit 218 selectively outputs instructions to other execution circuitry of processor 210, such as branch unit 220, a fixed-point unit A ("FXUA") 222, fixed-point unit B ("FXUB") 224, complex fixed-point unit ("CFXU") 226, load/store unit ("LSU") 228, and floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a Load instruction received from sequencer unit 218, LSU 228 inputs data from data cache 216 and copies such data to selected ones of rename buffers 234 and 238. If such data is not stored in data cache 216, then data cache 216 receives (through BIU 212 and system bus 211) the data from a system memory 260. Moreover, data cache 216 outputs the data to system memory 260 via through BIU 212 and system bus 211. In response to a Store instruction received from sequencer 218, LSU 228 inputs data from a selected one of GPRs 232 and FPRs 236 and copies this data to data cache 216.

Sequencer unit 218 inputs and outputs instructions to and from GPRs 232 and FPRs 236. From sequencer unit 218, branch unit 220 inputs instructions and signals indicating a present state of processor 210. In response to such instructions and signals, branch unit 220 outputs, to sequencer unit 218, signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As execution units store data at a selected one of rename buffers 234, the execution units associate this data with a storage location (e.g. one of GPRs 232 or carry bit (CA) register 242) as specified by the instruction for which the selected rename buffer is allocated. Sequencer unit 218 generates signals to cause data stored at a selected one of rename buffers 234 to be copied to its associated one of GPRs 232 or CA register 242. Sequencer unit 218 directs such copying of information stored at a selected one of rename buffers 234 in response to "completing" the instruction that generated the information. Such copying is called "writeback."

Execution units store data at a selected one of rename buffers 238. These execution units cause the association of data with one of FPRs 236. Sequencer 218 generates signals that cause data stored at a selected one of rename buffers 238 to be copied to its associated one of FPRs 236. Sequencer unit 218 directs such copying of data at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, processor 210 processes each instruction as a sequence of stages, each being executable in parallel with stages of other instructions. Such a technique is called "pipelining." In an illustrative embodiment, processor 210 processes an instruction normally as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218. In the decode stage, sequencer unit 218 decodes up to four fetched instructions. In the dispatch stage, sequencer unit 218 selectively dispatches up to four decoded instructions to selected ones of execution units 220, 222, 224, 226, 228, and 230 after reserving rename buffer entries in rename buffers 236 and 238 for the dispatched instructions' results (destination operand information). In the dispatch stage, sequencer unit 218 supplies operand information to the selected execution units for dispatched instructions. Processor 210 dispatches instructions in order of their programmed sequence.

In the execute stage, execution units, such as execution units 220, 222, 224, 226, 228, and 230, execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence.

In the completion stage, sequencer unit 218 indicates an instruction is "complete" by placing this indication in completion buffer 248. Processor 210 "completes" instructions in the order of their programmed sequence.

In the writeback stage, sequencer 218 directs the copying of data from rename buffers 234 and 238 to GPRs 232 and FPRs 236, respectively.

Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, instructions each require one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

Completion buffer 248, within sequencer 218, is used to track the completion of the multiple instructions that are being executed within the execution units, such as execution units 220, 222, 224, 226, 228, and 230. Upon an indication in completion buffer 248 that an instruction or a group of instructions have been completed successfully, in an application specified sequential order, completion buffer 248 may be utilized to initiate the transfer of the results of those completed instructions to the associated general-purpose registers, such as GPRs 232.

In addition, processor 210 also includes performance monitor unit 240, which is connected to instruction cache 214 as well as other units in processor 210. Operation of processor 210 can be monitored utilizing performance monitor unit 240, which in this illustrative embodiment is a software-accessible mechanism capable of providing detailed information descriptive of the utilization of instruction execution resources and storage control.

Although not illustrated in FIG. 2, performance monitor unit 240 couples to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, and cache hits.

Performance monitor unit 240 includes an implementation-dependent number (e.g., 2-8) of counters 241-242, labeled PMC1 and PMC2, which are utilized to count occurrences of selected events. Performance monitor unit 240 further includes at least one monitor mode control register (MMCR). In this example, two control registers, MMCRs 243 and 244, specify the function of counters 241-242. Counters 241-242 and MMCRs 243-244 are preferably implemented as special purpose registers (SPRs) that are accessible for read or write via MFSPR (move from SPR) and MTSPR (move to SPR) instructions executable by CFXU 226. However, in one alternative embodiment, counters 241-242 and MMCRs 243-244 may be implemented simply as addresses in I/O space.

In another alternative embodiment, the control registers and counters may be accessed indirectly via an index register. This embodiment is implemented in the IA-64 architecture in processors from Intel Corporation.

The various components within performance monitoring unit 240 may be used to generate data for performance analysis. Depending on the particular implementation, the different components may be used to generate trace data. In other illustrative embodiments, performance unit 240 may provide data for time profiling with support for dynamic address to name resolution. When providing trace data, performance monitoring unit 240 may include trace unit 245, which contains circuitry and logical units needed to generate traces. In particular, in these illustrative examples, trace unit 245 may generate compressed trace data.

Additionally, processor 210 also includes interrupt unit 250 connected to instruction cache 214. Although not shown in FIG. 2, interrupt unit 250 is connected to other functional units within processor 210. Interrupt unit 250 may receive signals from other functional units and initiate an action, such as starting an error handling or trap process. In these examples, interrupt unit 250 generates interrupts and exceptions that may occur during execution of a program.

The present invention recognizes that instruction traces have a high degree of redundancy that can be easily exploited by compression techniques. Unlike instruction addresses, data addresses for a memory referencing instruction rarely stay constant during program execution, but they can have a regular stride. No currently available algorithm or process is suitable for the efficient compression of data address traces in hardware.

The present invention provides a method, apparatus, and computer instructions for compressing a trace. In these examples, the trace may include an instruction trace and a data address trace as components that form the trace. The mechanism of the present invention reduces the size of an instruction trace and a data address trace by (1) replacing a stream of instruction addresses by a stream identifier and (2) relating data addresses to the corresponding load and store instructions in the stream.

In this manner, the compressed data address trace component contains information about data strides and their repetition counts. Further, the mechanism of the present invention also uses, in the illustrative embodiments, fixed-size storage structures, thus enabling address trace compression in hardware, in real-time. To be able to implement the trace compression in hardware, the compression algorithm must utilize storage structures of fixed size. The present invention employs a finite size stream cache and a finite size data address FIFO buffer. The size of these structures can be different in different implementations, depending on the available hardware budget. Larger structures provide a better compression ratio, though even relatively small structures provide a good compression ratio. In the illustrative examples, trace compressor 400 in FIG. 4 has fixed-size components stream cache 404 and data address FIFO buffer 406. In the illustrative examples, the hardware described in the following figures may be implemented within a performance monitoring unit, such as performance monitoring unit 240 in FIG. 2. In particular, this hardware may be located within trace unit 245 inside performance monitoring unit 240.

Figure 3:
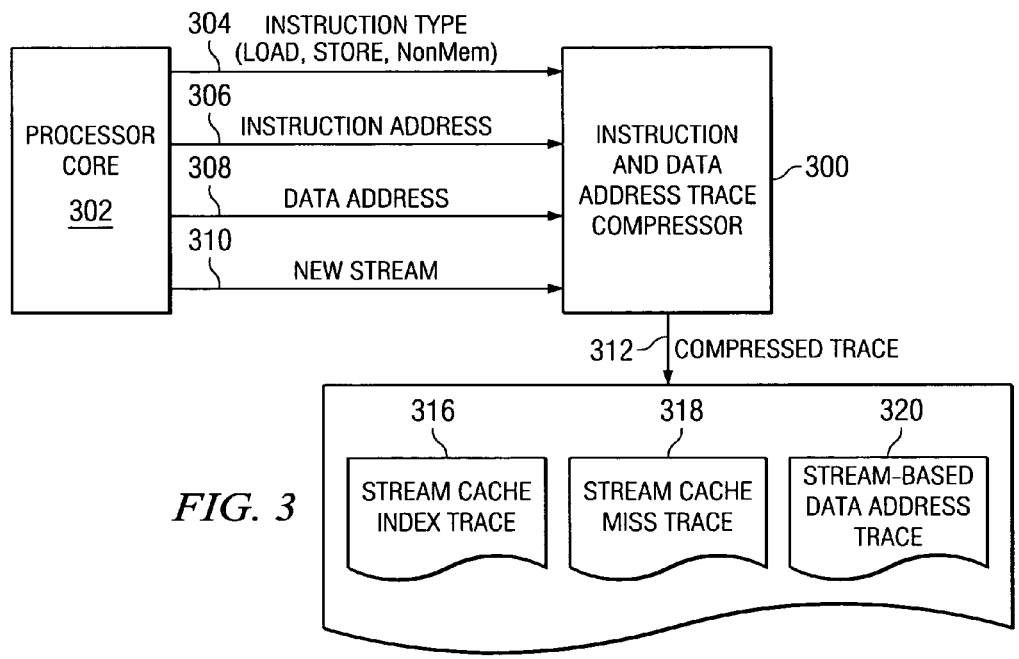
FIG. 3 is a diagram illustrating components used in compressing trace data in accordance with a preferred embodiment of the present invention.

FIG. 3 is a diagram illustrating components used in compressing trace data in accordance with a preferred embodiment of the present invention. In this example, instruction and data address trace compressor 300 generates compressed trace data 312 from instruction type 304, instruction address 306, data address 308, and new stream indicator, output by processor core 302. Processor core 302 corresponds to all processor components 210 except performance monitoring unit 240 in FIG. 2. The instruction stream is moved to the instruction cache 214. The processor core 302 contains the instruction stream. The instructions stream is the sequence of instructions being executed. Instruction data address trace compressor 300 may be implemented in trace unit 245 in FIG. 2 to process instruction streams. An instruction stream also may be referred to as a stream. An instruction stream is a sequential run of instructions, ending either with an instruction that changes the control flow or when the instruction stream reaches the maximal predefined length.

For example, instructions from the target of a taken branch to the first following taken branch form an instruction stream. Let us consider a case where the processor executes a jump instruction to the address 1000. Let the instruction at the address 1000 be a load instruction, the instruction at the address 1004 an add instruction, and the instruction at the address 1008 a jump instruction to the address 2000. Then the instruction at the address 1000 is the first instruction in an instruction stream. This instruction stream comprises of instructions at the addresses 1000, 1004, and 1008. The instruction at the address 2000 is the beginning of another instruction stream.

An instruction stream can be uniquely identified by its starting address (SA) and its length (L). The starting address for a stream is referred to as a stream start address (S.SA), and the length of the stream is referred to as a stream length (S.L). In the previously described case, the S.SA=1000 and S.L=3.

In this illustrative example, processor core 302 sends instruction type 304, instruction address 306, data address 308, and new stream indicator 310 to instruction and data address trace compressor 300. Instruction type 304 identifies an instruction as having a certain type or category. For example, an instruction at an instruction address 306 may be identified as being a load instruction, a store instruction, or an instruction that does not reference memory. If an instruction at the address 306 is referencing memory, that is, reading data from or writing data to a memory address, the processor core 302 also sends data address 308 to trace compressor 300. Data for an operation is found at the data address.

New stream indicator 310 indicates the occurrence of a new instruction stream. A new instruction stream occurs based on different events. For example, a taken branch, an interrupt, a return, or the instruction stream reaching the maximum stream length may result in a new stream causing processor core 302 to generate new stream indicator 310.

In response to receiving this information, instruction and data address trace compressor 300 generates compressed trace 312. As illustrated in FIG. 3, compressed trace 312 contains stream cache index trace (SCIT) 316, stream cache miss trace (SCMT) 318, and stream-based data address trace (SBDT) 320. These three components are logical traces that form compressed trace 312 in this illustrative example.

In alternative embodiments, compressed trace 312 can include other components. In one alternative embodiment, a separate trace component can include information about loaded modules and dynamic program module loading and unloading, that is, information about dynamic address-to-name mapping.

Figure 4:
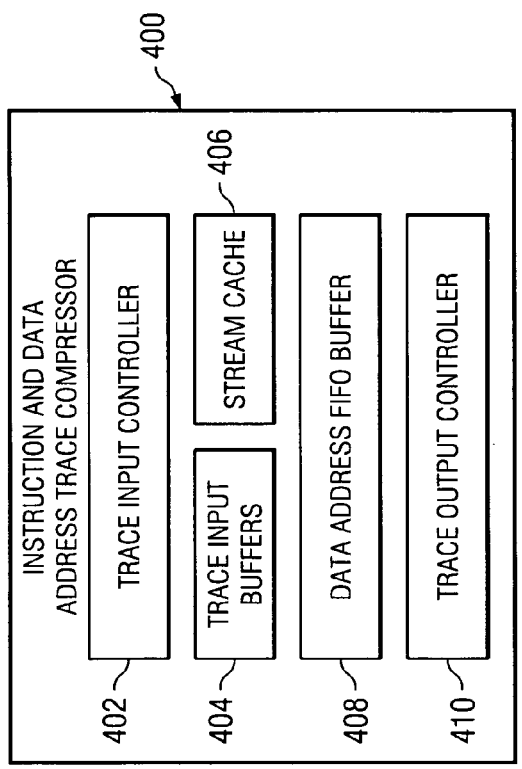
FIG. 4 is a diagram illustrating components in an instruction and data address trace compressor in accordance with a preferred embodiment of the present invention.

Next, FIG. 4 is a diagram illustrating components in an instruction and data address trace compressor in accordance with a preferred embodiment of the present invention. As depicted, instruction and data address trace compressor 400 is a more detailed illustration of trace compressor 300 in FIG. 3.

Trace compressor 400 contains trace input controller 402, trace input buffers 404, stream cache 406, data address FIFO buffer 408, and trace output controller 410. Trace input controller 402 receives data from processor core 302 in FIG. 3, and stores relevant data in trace input buffers 404. When trace input controller 402 receives NewStream indicator 310, trace input controller 402 stores the value of instruction address 306 as the beginning of a new stream, S.SA, in trace input buffers 404. Trace input controller 402 then starts counting the number of instructions in that stream by setting the S.L value to 1 and incrementing it by 1 for each following instruction in the stream. Trace input controller 402 stores the type of each instruction in trace input buffers 404; for a memory referencing instruction trace input controller 402 also stores the accessed data address. When trace input controller 402 receives another NewStream indicator 310, it means that the previous stream has ended, so the current S.L value is stored in trace input buffers 404. As explained later, stream cache 406 generates compressed trace components SCIT 316 and SCMT 318; data address FIFO buffer 408 generates SBDT 320. Trace output controller 410 controls the output of these three trace components. Many modifications and variations of trace output controller 410 will be apparent to those of ordinary skill in the art. For example, trace output controller 410 can combine all trace components into one trace and then output the combined trace to dedicated processor pins, similarly to the ARM trace funneling. In this case, trace output controller 410 generates the value of the trace header field that specifies the sizes of different trace components in one combined trace record. If we want to trace the information about the executing process, trace output controller 410 can also reinitialize all relevant structures at a context switch between two processes and append the process identifier, process id, to the first trace header after the switch. In a multiprocessor system, trace output controller 410 can combine trace components coming from different processors and append relevant processor information to the trace.

Figure 5:
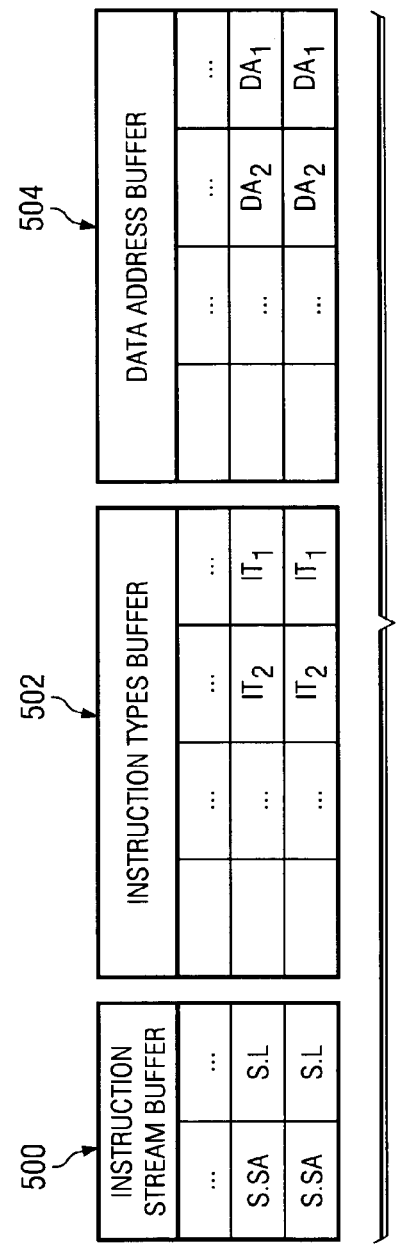
FIG. 5 is a diagram illustrating components in trace input buffers in accordance with a preferred embodiment of the present invention.

FIG. 5 is a diagram illustrating components in trace input buffers 404 in FIG. 4 in accordance with a preferred embodiment of the present invention. As illustrated, trace input buffers include instruction stream buffer 500, instruction types buffer 502, and data address buffer 504. These trace input buffers are used to enable trace compression without the need to stall the processor, by buffering data addresses, instruction types and stream start addresses and lengths for more than one stream. Although the average length of one instruction stream is about 12 instructions for SPEC CPU2000 integer applications and about 117 instructions for floating point applications, a stream in the worst case can have only one instruction. For example, if the first instruction in a stream is an unconditional jump instruction, then it is also the last instruction in that stream. In the average case, trace compressor 400 compresses the previous instruction stream during the time that the current instruction stream is being buffered.

Instruction stream buffer 500 contains a stream start address (S.SA) and a stream length (S.L) for each instruction stream. Instruction type buffer 502 contains instruction type identifiers for instructions in an instruction stream. Data address buffer 504 contains addresses of memory locations accessed by memory referencing instructions in an instruction stream. All three trace input buffers are FIFO buffers, i.e., data is read from the beginning of the buffer, the so-called buffer front, and written to the end of the buffer, the so-called buffer rear.

Figure 6:
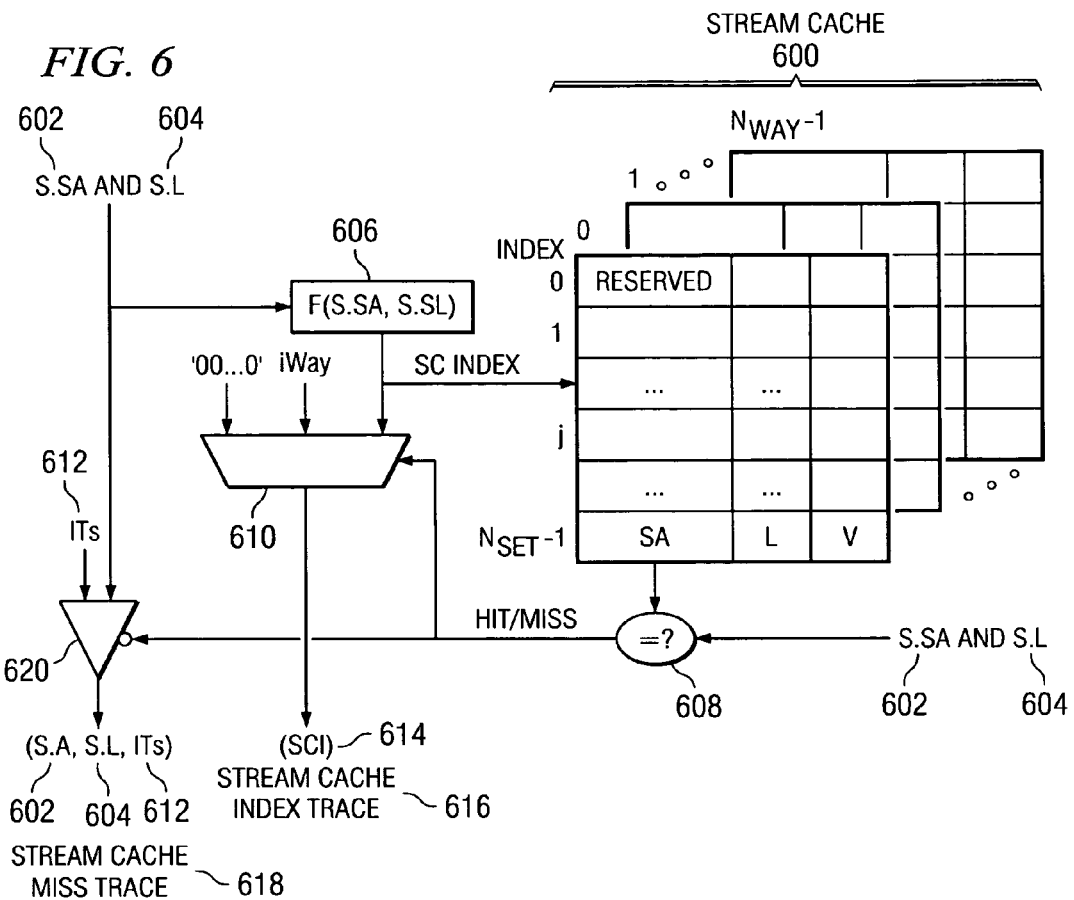
FIG. 6 is a diagram illustrating components used to compress an instruction address trace in accordance with a preferred embodiment of the present invention.

Next, FIG. 6 is a diagram illustrating components used to compress an instruction address trace generated during execution of instructions by a processor core in accordance with a preferred embodiment of the present invention. The logical components illustrated in FIG. 6 are components in stream cache 406 in FIG. 4. These components are those specifically used to compress the instruction address trace component and to keep information about last data addresses for memory referencing instructions in an instruction stream. The trace compressor needs to keep an information about the last data address of an instruction so that when that instruction is executed again, this address can be used for data address compression process as explained later.

Set-associative stream cache 600 is an example of a stream cache memory, such as stream cache 404 in FIG. 4. In any set-associative instruction cache memory, a cache controller stores/reads an instruction in one of the cache ways in a particular cache set. The cache controller determines which set should be accessed, i.e., calculates the cache set index, using some of the instruction address bits. When the cache controller stores an instruction, it also stores instruction address or part of it as the cache tag. The cache tag serves to uniquely identify the stored instruction, because more than one instruction can be stored in the same cache set. A cache hit happens when the cache controller finds the instruction it is looking for in the cache; otherwise, a cache miss happens.

In the preferred embodiment, function unit 606 reads the values of S.SA 602 and S.L 604 from the front of the instruction stream buffer 500 in FIG. 5 and calculates the cache set index by using a simple function of S.SA 602 and S.L 604. This function is, for example, a bit-wise XOR of selected S.SA and S.L bits and/or bit concatenation. The S.SA 602 and S.L 604 constitute a cache tag. Cache controller (not shown in FIG. 6) accesses the cache set determined by function unit 606 and searches the cache locations in that set (cache ways) for a tag that matches the S.SA 602 and S.L 604. A cache hit means that the cache controller has found a match in one of the ways and that way has valid information, i.e., its valid bit V is set to 1.

In the case of a cache hit in stream cache 600, multiplexer 610 outputs the corresponding stream cache index (SCI) 614 (concatenated set and way) into stream cache index trace 616. In this illustrative example, the size of this index in bits is $\log_2 (N_{way} * N_{set})$ where $N_{way}$ is the number of stream cache ways and $N_{set}$ is the number of sets.

Next, in the case of a cache miss, cache controller updates the stream cache 600, multiplexer 610 outputs a reserved cache index (0 . . . 0) into stream cache index trace 616, and 3-state buffer 620 outputs the complete relevant stream information, such as stream start address (S.SA) 602, stream length (S.L) 604, and instruction types (ITs) 612 into stream cache miss trace 618. The output of 3-state buffer 620 is enabled only in the case of a cache hit by cache hit/miss signal 608.

The cache location indicated by the reserved cache index is never used to store the stream data in these illustrative examples. If the implemented cache replacement policy indicates that the cache entry (0, 0) should be replaced, the cache controller should choose the first following location instead.

In alternative embodiments, there may be more than one cache index number reserved for special events. In one alternative embodiment, one special event is that a program module has been unloaded and another one loaded in the same address space, and this event might be indicated by the reserved cache index (1, 0). In this alternative embodiment, an additional trace compressor component emits the information about dynamic address-to-name mapping to a separate trace component, for example to a dynamic address mapping trace. In this alternative embodiment there is no need to record instruction types ITs in the stream cache miss trace because precise instruction-to-address mapping can be reconstructed from dynamic address mapping trace and the source code disassembly. In this embodiment, the instruction stream may be reduced to identify basic blocks, for example, a start address, branch from address and a branch to address to indicate transfer of control. Other compression techniques such as identifying the number of instructions instead of the branch from address may be used.

Figure 7:
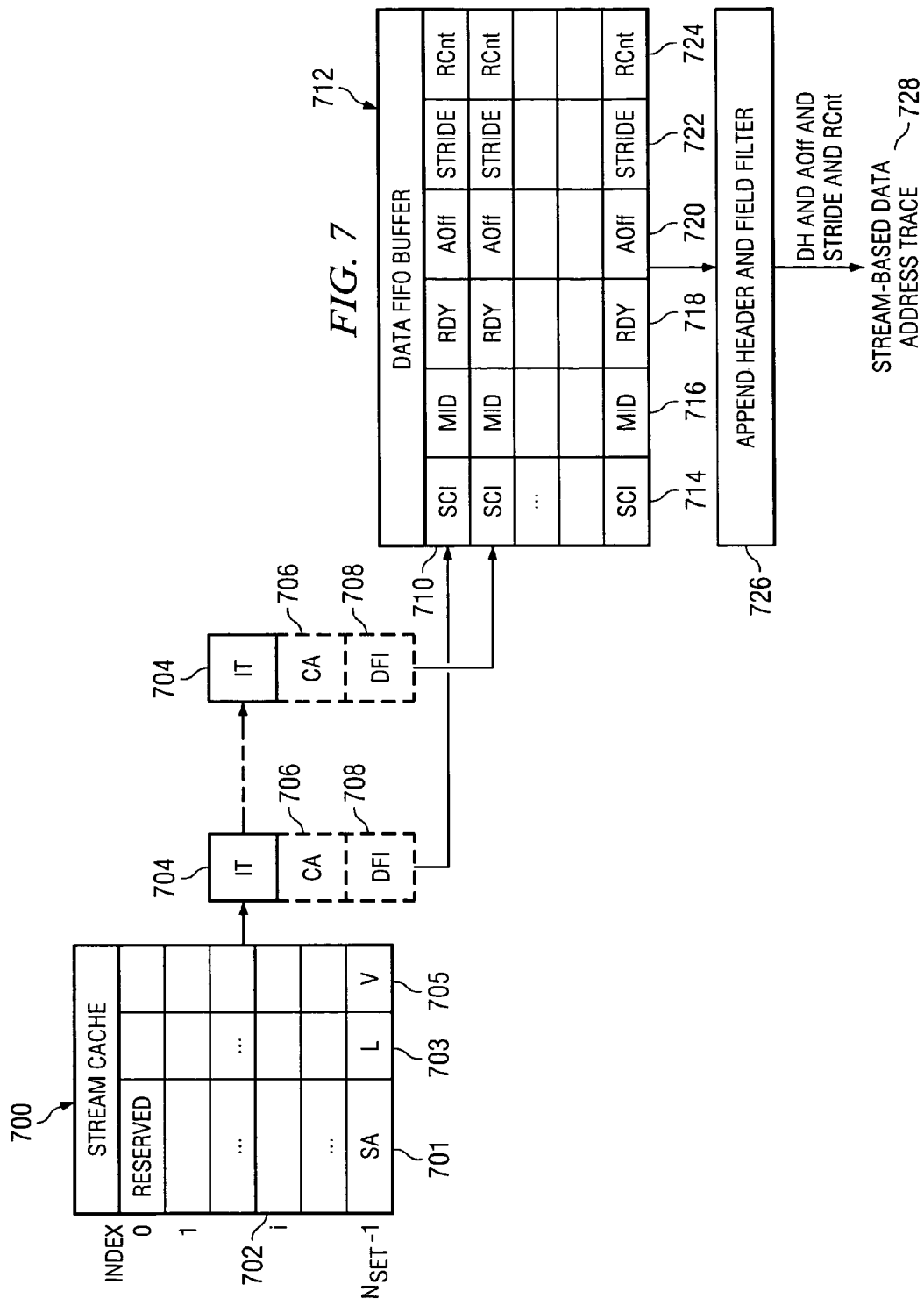
FIG. 7 is a diagram of components used to process data addresses in an instruction and data address compressor in accordance with a preferred embodiment of the present invention.

FIG. 7 is a diagram of components used to process data addresses in an instruction and data address compressor in accordance with a preferred embodiment of the present invention. Stream starting address 701 and length 703 fields in the stream cache 700 serve as a tag. Stream cache 700 is an example of stream cache 404 in FIG. 4. In these examples, each stream cache entry in stream cache 700 also includes instruction type (IT) 704 for each instruction in the corresponding stream, and current address (CA) 706 and data FIFO index (DFI) 708 for each memory-referencing instruction in the stream.

For example, entry 702 contains IT field 704, CA field 706, and DFI field 708 for a particular memory referencing instruction. DFI field 708 stores the data FIFO index. This index points to an entry, such as entry 710, in the data address FIFO buffer 712 that holds information about a related data address. Data address FIFO buffer 712 is an example of data address FIFO buffer 406 in FIG. 4. Data address FIFO buffer entry 710 has the following fields: stream cache index (SCI) 714, memory reference index inside the stream (MID) 716, ready flag (RDY) 718, address offset (Aoff) 720, data stride (stride) 722, and repetition count (RCnt) 724.

[NOTE: the deleted text is redundant, since the relevant processes are explained using flowcharts later.]

Compressor 400 emits records from data address FIFO buffer 712 to stream-based address trace (SBDT) 728 when the buffer is full or when a signal to stop tracing is received. A record in SBDT 728 contains information about address offset, stride, and repetition count, and it can have variable length and number of fields. Before being emitted to SBDT 728, the FIFO entry from data FIFO buffer 712 passes through append header and field filter control logic 726, which calculates and appends data header (DH) to the data and filters data so that only the minimum necessary length is emitted (e.g., 1 byte instead of maximum 4 bytes). The DH encodes the length and the most frequent values of other fields.

Figure 8:
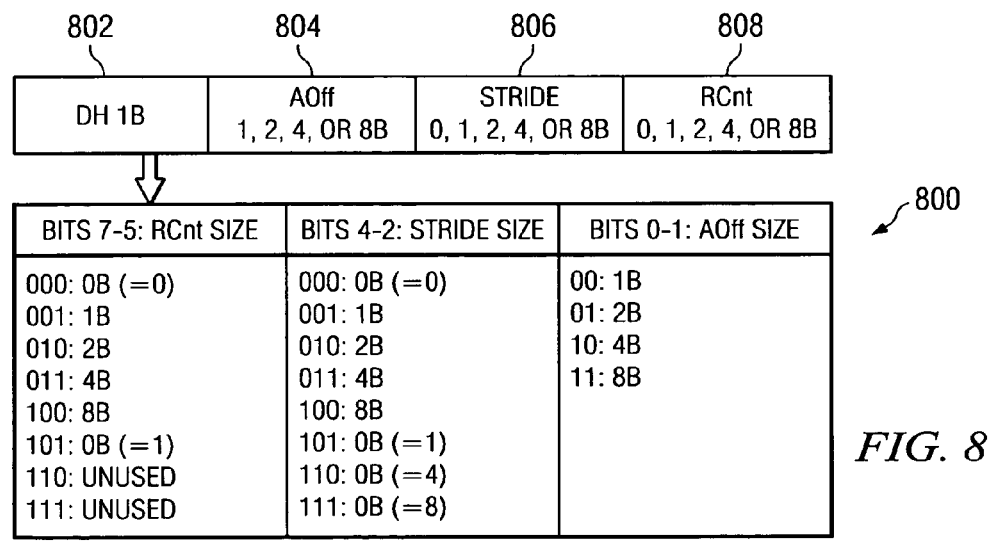
FIG. 8 is a diagram of a format for a stream-based data address trace in accordance with a preferred embodiment of the present invention.

FIG. 8 is a diagram of one possible format for a SBDT 800 depicted in accordance with a preferred embodiment of the present invention. In this example, SBDT 800 contains the following fields: DH 802, Aoff 804, stride 806, and RCnt 808. RCnt 808 values 0 and 1 and stride 806 values 0, 1, 4, and 8 can be encoded in DH 802; and the format allows the variable length of AOff 804 (1, 2, 4, or 8 bytes), stride 806, and RCnt 808 fields (0, 1, 2, 4, or 8 bytes). Other similar formats more suited to the traced architecture can also be used, for example a format for multiple loads and stores.

Figure 9:
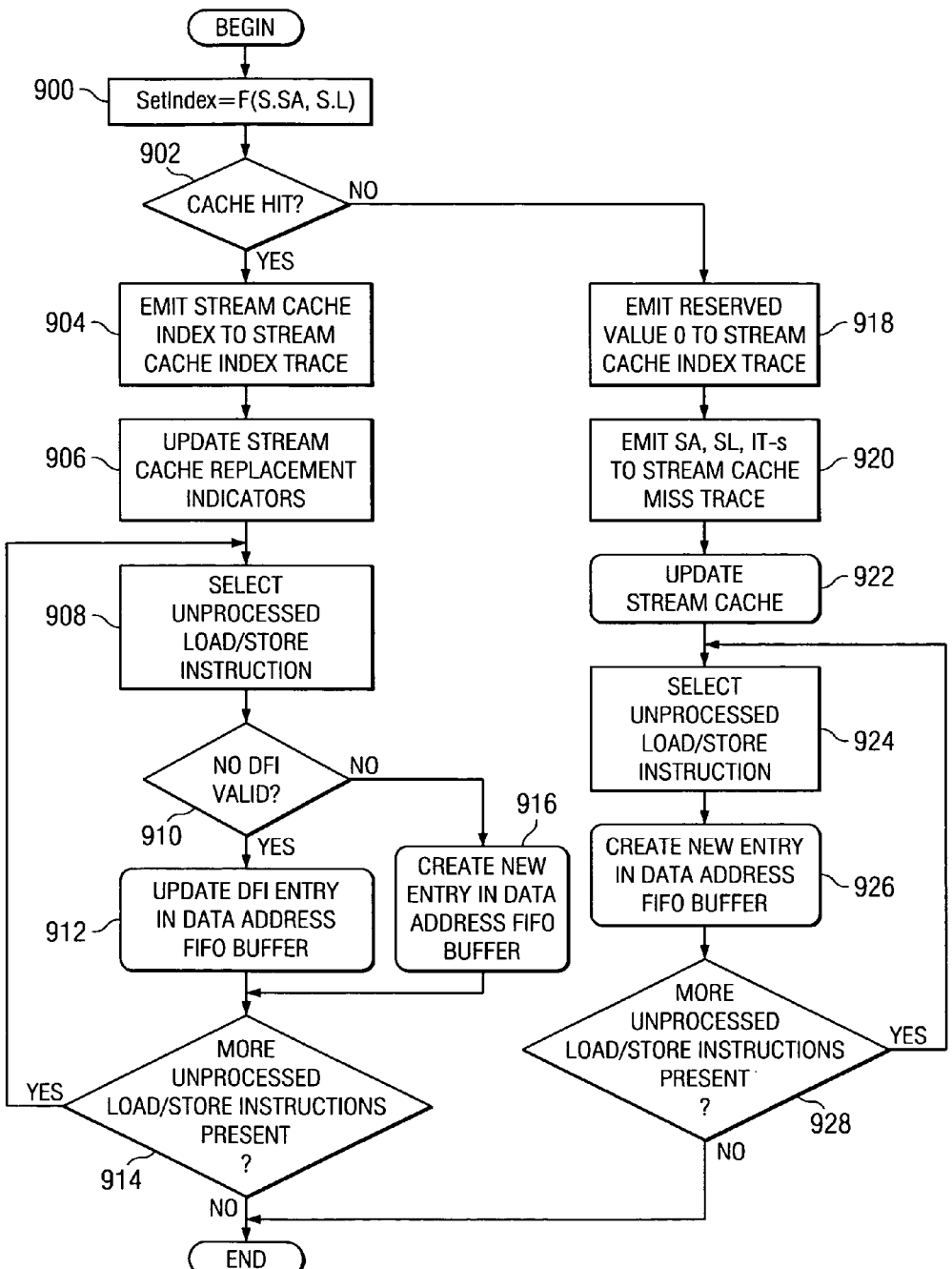
FIG. 9 is a flowchart of a process for address trace compression in accordance with a preferred embodiment of the present invention.

FIG. 9 is a flowchart of a process for address trace compression in accordance with a preferred embodiment of the present invention. The process illustrated in FIG. 9 may be implemented in a trace compressor such as instruction and data address trace compressor 300 in FIG. 3.

The process begins generating a stream cache set index using a function with the stream start address and the stream length as inputs to the function (step 900). As explained before, this function can be, for example, a bit-wise XOR of selected S.SA and S.L bits and/or bit concatenation. Next, a determination is made as to whether a cache hit is present (step 902). As explained before, a cache hit is present if a cache tag matching to concatenated S.SA and S.L is found in the cache set pointed by cache set index. This determination is made using the stream cache set index as an input into the stream cache. A cache hit is present if a match is found in the stream cache. If a cache hit is present in the stream cache, the stream cache index is emitted to stream cache index trace (step 904).

Thereafter, the process updates the stream cache replacement indicators (step 906). The process then selects an unprocessed load or store instruction for processing (step 908). Then, a determination is made as to whether a valid DFI is present for this instruction (step 910). If a valid DFI is present, the process updates the DFI entry in the data address FIFO buffer (step 912). Next, a determination is made as to whether there are more unprocessed load and store instructions present (step 914). If more unprocessed load or store instructions are not present, the process terminates thereafter. In the same manner, if more unprocessed load or store instructions are present, the process returns to step 908 to select another unprocessed load or store instruction for processing.

Turning back to step 910, if a valid DFI is not present, the process creates a new entry in the data address FIFO buffer (step 916), with the process proceeding to step 914 to determine whether more unprocessed load or store instructions are present.

With reference again to step 902, if a cache hit is not present, the process emits a reserved value 0 to stream cache index trace (step 918). Then, the process emits S.A, S.L, and ITs to stream cache miss trace (step 920). The process then updates the stream cache (step 922). Then, the process selects unprocessed load and store instructions (step 924). The process then creates a new entry in the data address FIFO buffer (step 926).

Next, a determination is made as to whether more unprocessed load or store instructions are present (step 928). If more load or store instructions are not present, the process terminates thereafter. On the other hand, if more load and store instructions are present, the process returns to step 924 to select another unprocessed load or store instruction for processing.

Figure 10:
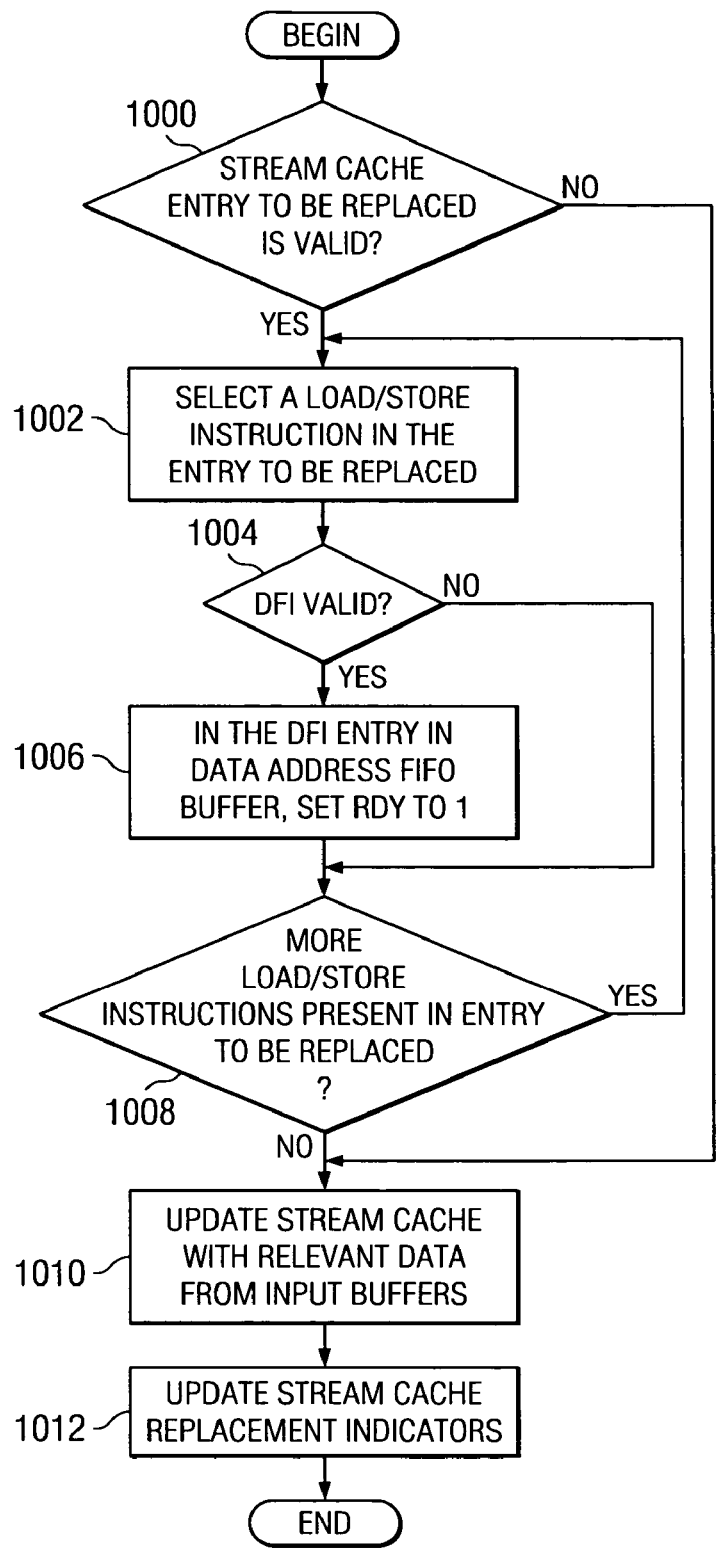
FIG. 10 is a flowchart of a process for updating a stream cache in accordance with a preferred embodiment of the present invention.

FIG. 10 is a flowchart of a process for updating a stream cache in accordance with a preferred embodiment of the present invention. The process illustrated in FIG. 10 is a more detailed description of step 922 in FIG. 9.

The process begins by determining whether the stream cache entry to be replaced is valid (step 1000). If the stream cache entry to be replaced is valid, that is, its valid bit is set to 1, a load and store instruction in the entry to be replaced is selected (step 1002). Thereafter, a determination is made as to whether the DFI is valid (step 1004). If a valid DFI is present, the process sets RDY to 1 in the DFI entry in data address FIFO buffer (step 1006). Next, a determination is made as to whether more load and store instructions are present in the entry to be replaced (step 1008). If more load and store instructions in the entry to be replaced are not present, the process updates the stream cache with relevant data from input buffers (step 1010). Then, the process updates the stream cache replacement indicators (step 1012), with the process terminating thereafter.

Turning back to step 1000, if a stream cache entry to be replaced is not valid, the process proceeds to step 1010 to update the stream cache with relevant data from input buffers.

With reference again to step 1004, if a valid DFI is not present, step 1006 is bypassed with the process proceeding to step 1008 to determine whether there are more load and store instructions present in the entry to be replaced. With reference back to step 1008, if more load and store instructions in the entry to be replaced are present, the process returns to step 1002 to select more load store instructions in the entry to be replaced.

Figure 11:
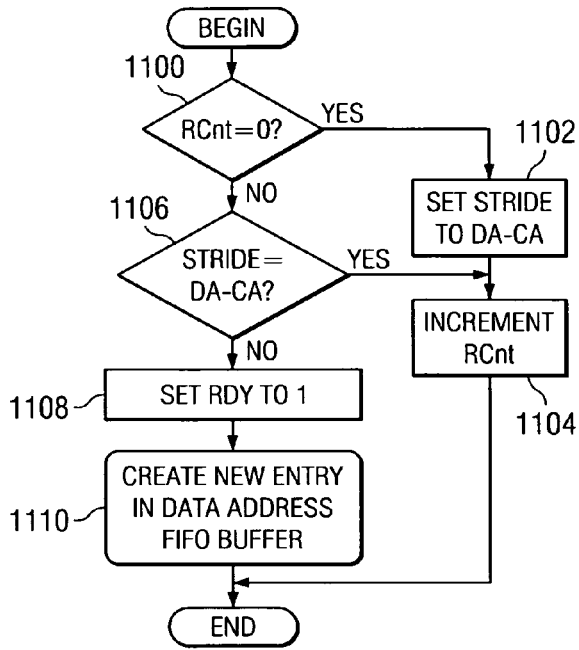
FIG. 11 is a flowchart of a process for updating an entry in a data address FIFO buffer in accordance with a preferred embodiment of the present invention.

FIG. 11 is a flowchart of a process for updating an entry in a data address FIFO buffer in accordance with a preferred embodiment of the present invention. The process illustrated in FIG. 11 is a more detailed description of step 912 in FIG. 9.

The process begins by determining whether RCnt equals 0 (step 1100). The process sets the stride to DA-CA (step 1102). Then, the process increments RCnt (step 1104), with the process terminating thereafter.

Turning back to step 1100, if RCnt does not equal 0, a determination is made as to whether stride equals DA-CA (step 1106). If a stride equaling DA-CA is present, the process proceeds to step 1104 to increment RCnt.

With reference again to step 1106, if a stride equaling DA-CA is not present, the process sets RDY to 1 (step 1108). Next, the process creates a new entry in the data address FIFO buffer (step 1110), with the process terminating thereafter.

Figure 12:
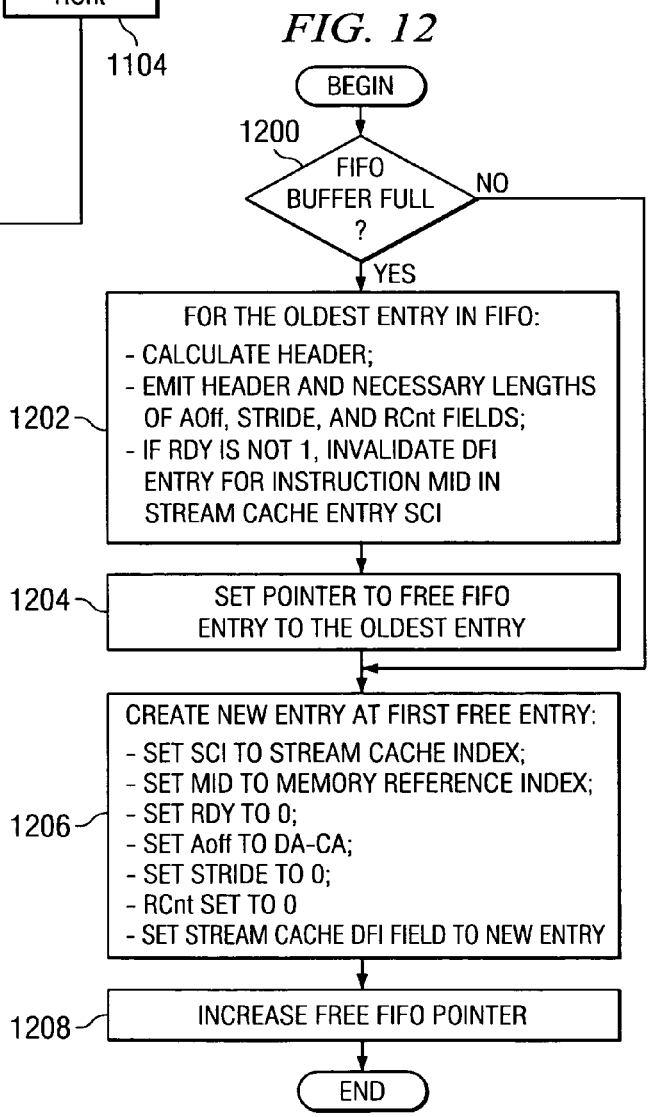
FIG. 12 is a flowchart of a process for creating a new entry in a data address FIFO buffer in accordance with a preferred embodiment of the present invention.

FIG. 12 is a flowchart of a process for creating a new entry in a data address FIFO buffer in accordance with a preferred embodiment of the present invention. The process illustrated in FIG. 12 is a more detailed description of steps 916 and 926 in FIG. 9.

The process begins by determining whether the FIFO buffer is full (step 1200). If a determination is made that the FIFO buffer is full, the process calculates the header, emits the header and the necessary lengths of Aoff, stride, and RCnt fields for the oldest entry in the FIFO to the stream based data trace; if RDY is not 1, the DFI entry for instruction MID in stream cache entry SCI is invalidated (step 1202). The process sets the pointer that should point to the first free FIFO entry to point to the oldest entry (step 1204). This entry is the entry that has just been written to the stream based data trace. The process creates a new entry at the first free entry with fields in which SCI is set equal to stream cache index, sets the MID to memory reference index, sets RDY to 0, sets Aoff to DA-CA, sets the stride to 0, and sets RCnt to 0 (step 1206). In this step, the process also sets the value of DFI in the stream cache entry SCI and field MID to the index of new FIFO entry. The process then increments the free FIFO pointer (step 1208), with the process terminating thereafter.

In addition to compressing data, the mechanism of the present invention provides for decompressing the trace for analysis at a later point in time. In these examples, the mechanism is implemented in a software analysis tool used to analyze trace data. The decompression mechanism also uses a stream cache storage structure, with the same number of sets and ways as the structure used during compression of trace data as described above. For each memory referencing instruction in a stream, a decompression stream cache entry also keeps current address, stride, and repetition count. These fields are initialized to zero. This stream cache storage is similar to the stream cache as found in FIG. 4. The decompression is performed in software in these illustrative examples.

When the decompression mechanism of the present invention encounters a stream cache index 0 in the stream cache index trace, this mechanism reads the full stream information from the stream cache miss trace and stores this information in the cache using the same index function and replacement mechanism as the compression mechanism. Valid stream cache index in the stream cache index trace (different from 0) points to the stream cache entry with valid stream information. Instruction addresses are simply obtained by incrementing the stream start address by the corresponding instruction length. If instructions have variable lengths, instruction addresses can be obtained by combining traces with disassembly information or by keeping length information in the trace, together with the instruction type.

If an instruction is a load or a store, the decompression mechanism first verifies the value of the repetition count. If the repetition count is zero, a stream based data trace (SBDT) record is read and the fields are updated. The data address is obtained by adding the value of the Stride field to the current address, and the repetition count is decremented.

Figure 13:
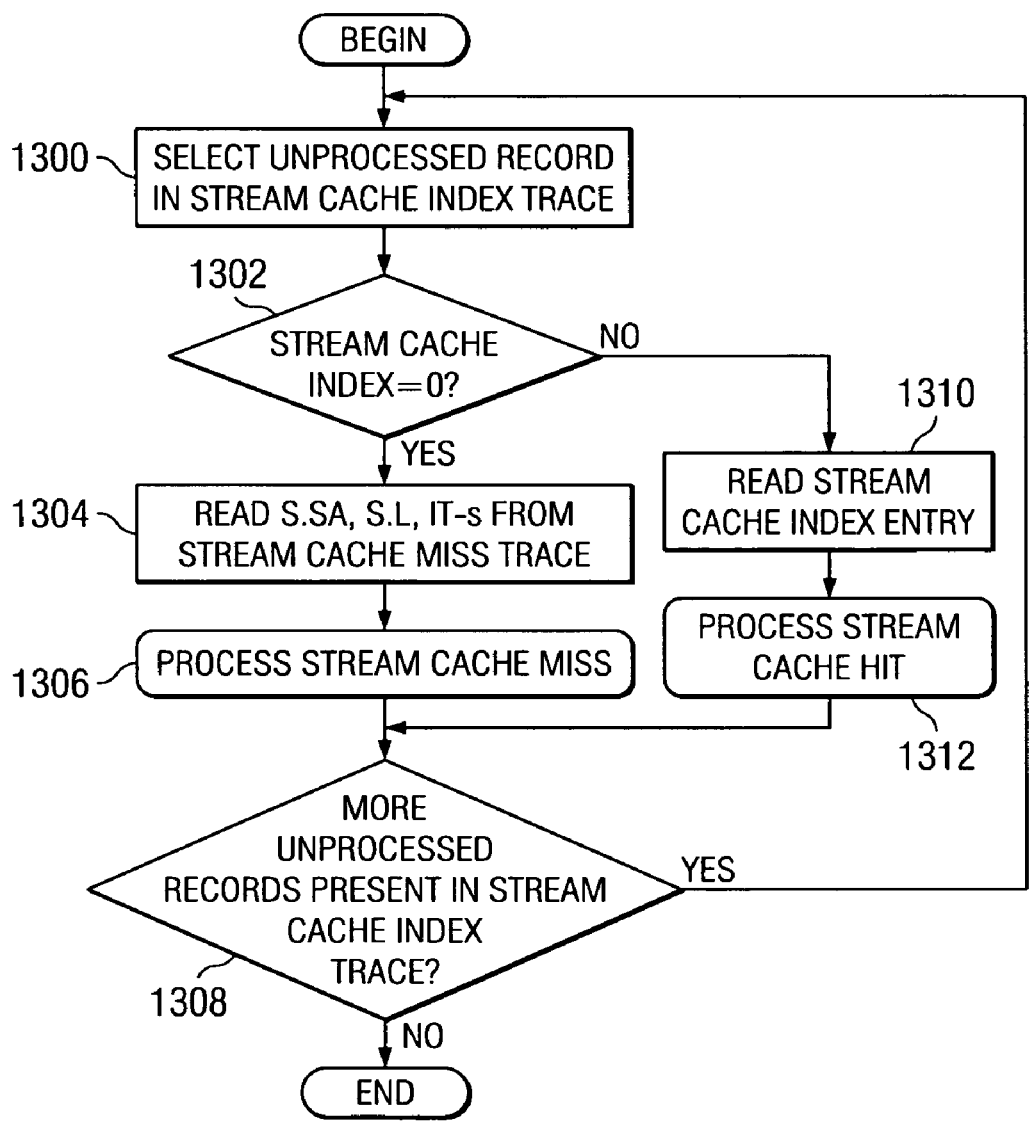
FIG. 13 is a flowchart of a process for address trace decompression in accordance with a preferred embodiment of the present invention.

Next, FIG. 13 is a flowchart of a process for address trace decompression in accordance with a preferred embodiment of the present invention. The process illustrated in FIG. 13 may be implemented in a decompression process, such as a trace analysis tool.

The process begins by selecting an unprocessed record in stream cache index trace (step 1300). A determination is made as to whether the stream cache index equals 0 (step 1302). If a stream cache index equaling 0 is present, the process reads S.SA, S.L, and ITs from stream cache miss trace (step 1304). The process processes the stream cache miss (step 1306).

Then, a determination is made as to whether more unprocessed records are present in stream cache index trace (step 1308). If more unprocessed records in stream cache index trace are not present, the process terminates thereafter. If more unprocessed records in stream cache index trace are present, the process returns to step 1300 to select an unprocessed record in stream cache index trace.

Turning back to step 1302, if stream cache index equaling 0 is not present, the process reads the stream cache index entry (step 1310). Next, the process processes the stream cache hit (step 1312), with the process proceeding to step 1308 to determine whether there are more unprocessed records present in stream cache index trace.

Figure 14:
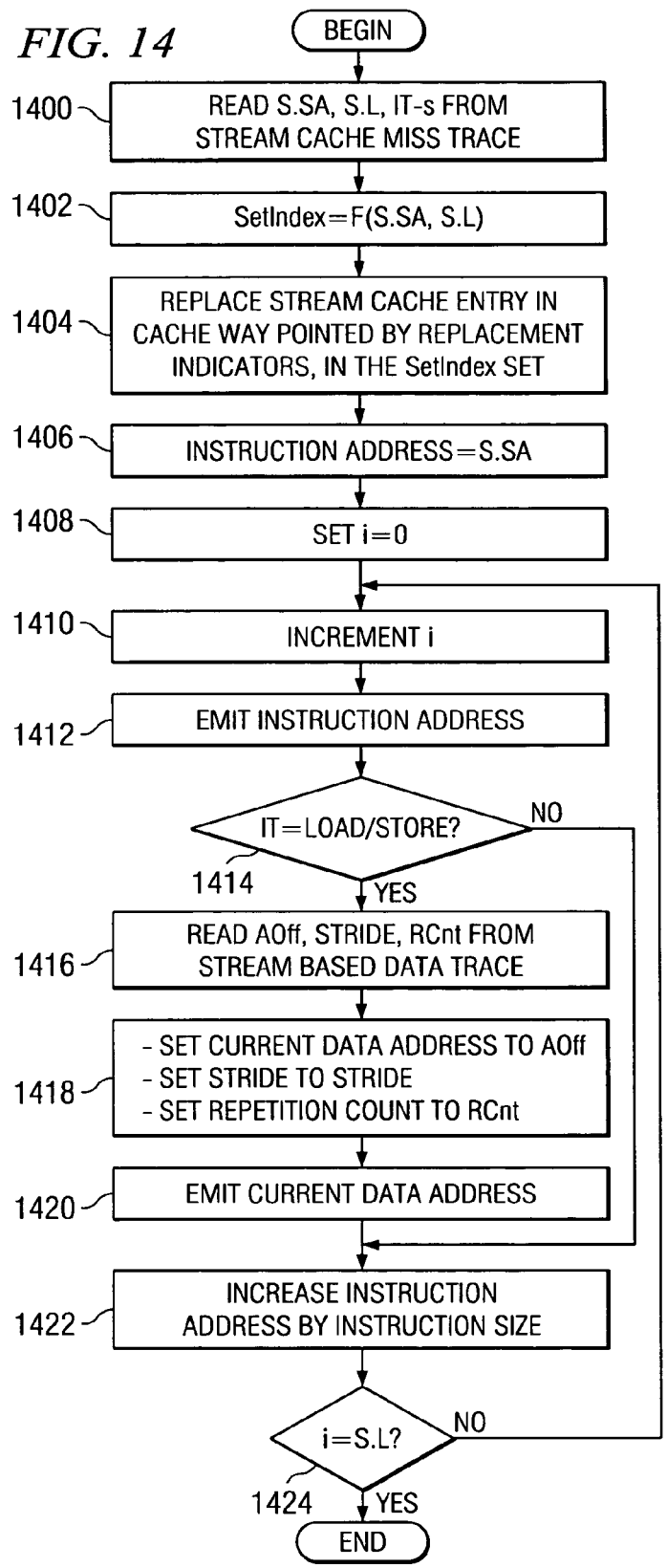
FIG. 14 is a flowchart of a process for processing a stream cache miss in accordance with a preferred embodiment of the present invention.

FIG. 14 is a flowchart of a process for processing a stream cache miss in accordance with a preferred embodiment of the present invention. The process illustrated in FIG. 14 is a more detailed description of step 1306 in FIG. 13.

The process begins by reading the S.SA, S.L, and ITs from stream cache miss trace (step 1400).

The process then determines the stream cache set index Set-Index is determined using a function based on the stream starting address S.SA and the S.L (step 1402). It is the same hash code, hash code index or function as mentioned in function unit 606 and step 900. Of all cache entries in the stream cache set SetIndex, the one pointed by replacement indicators is replaced. The process then sets the instruction address equal to the S.SA (step 1406). Next, the process sets i equal to 0 (step 1408). Thereafter, the process increments i (step 1410). The process emits the instruction address to the decompressed trace (step 1412).

Then, a determination is made as to whether IT is a load or store instruction type (step 1414). If IT is a load or store instruction type, the process reads the AOff, stride, and RCnt fields from stream based data trace (step 1416). The process sets the current data to the value of the Aoff field, sets the stride to the value of the stride field, and sets the repetition count to RCnt field (step 1418). The process then emits the current data address (step 1420). The process obtains the next instruction address by increasing the current instruction address by the corresponding instruction size (step 1422). If all instructions are of the same size, for example, 4 bytes, instruction address is increased for that value. As explained before, if instructions can have different lengths, this information is saved in the trace, for example, together with instruction type information. The information about current instruction size is used to calculate the next instruction address.

Next, a determination is made as to whether i equals S.L (step 1424). If i equals S.L, the process terminates thereafter. If i does not equal S.L, the process returns to step 1410 to increment i.

Turning back to step 1414, if an IT for a load or store instruction is not present, the process proceeds to step 1422 to increase instruction address by instruction size.

Figure 15:
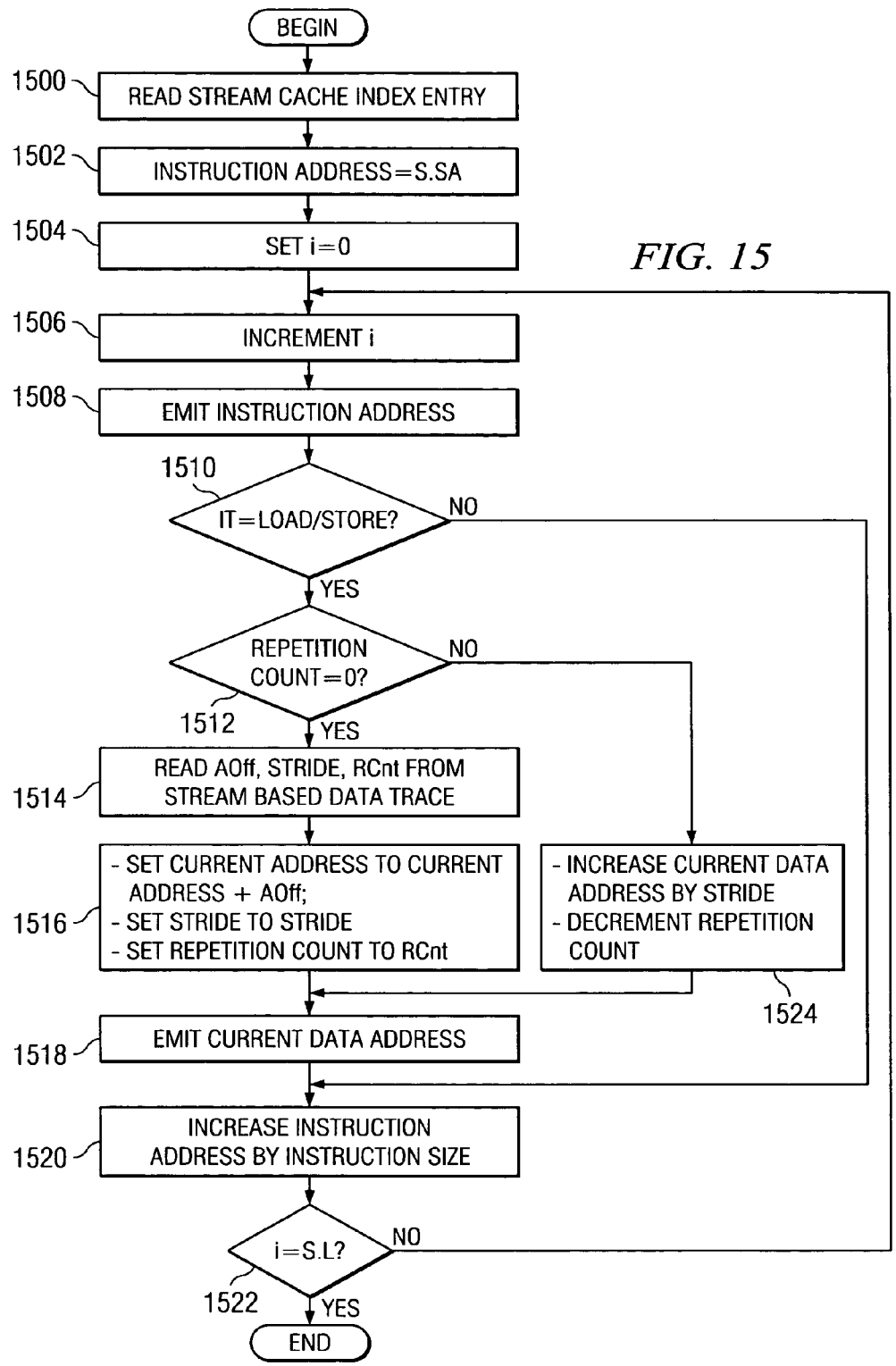
FIG. 15 is a flowchart of a process for processing a stream cache hit in accordance with a preferred embodiment of the present invention.

FIG. 15 is a flowchart of a process for processing a stream cache hit in accordance with a preferred embodiment of the present invention. The process illustrated in FIG. 15 is a more detailed description of step 1312 in FIG. 13.

The process begins by reading stream cache index entry (step 1500). The process set the instruction address equal to S.SA (step 1502). Next, the process sets i equal to 0 (step 1504). Then, the process increments i (step 1506). The process then emits the instruction address to the decompressed trace (step 1508).

Then, a determination is made as to whether the IT is a load or store instruction type (step 1510). If a load or store instruction type is present, a determination is made as to whether repetition count equals 0 (step 1512). If repetition count does not equal 0, the process reads the values for the Aoff, stride, and RCnt fields from stream based data trace (step 1514). The process sets the current address to the current address plus the value of the Aoff field, sets stride to value of the stride field, and sets repetition count to value of the RCnt field (step 1516). Then, the process emits the current data address (step 1518).

The process then increases the instruction address by instruction size (step 1520). Next, a determination is made as to whether i equals S.L (step 1522). If i equals S.L, the process terminates thereafter. If i does not equal S.L, the process returns to step 1506 to increment i.

Turning back to step 1510, if the IT is not a load or store instruction type, the process proceeds to step 1520 to increase instruction address by instruction size.

Turning back to step 1512, if repetition count does not equal 0, the process increases the current data address by the stride and decrements the repetition count (step 1524), with the process proceeding to step 1518 to emit current data address.

Next, FIG. 16 is a diagram depicting graph 1600, which is a comparison of instruction traces, in accordance with a preferred embodiment of the present invention. Trace data generated through the stream cache trace compression mechanism of the present invention was compared to several other trace formats. For comparison, traces of 10 SPEC CPU2000 integer and 13 floating-point benchmarks were used. Two segments were traced for each benchmark: the first two billion instructions (F2B), and two billion instructions after skipping 50 billion (M2B), thus making sure that the results do not overemphasize program initialization. Traces in graph 1600 were generated using a modified SimpleScalar environment, precompiled Alpha binaries, and SPEC CPU2000 reference inputs. The comparison metric is the average number of bits per one instruction in a trace.

In this example, the traces in graph 1600 are Dinero 1602, PDATS 1604, SBC 1606, and SCTC 1608. Dinero is an instruction and data address trace format where each record consists of the address of the memory reference and the reference type (read, write, or instruction fetch). Graph 1600 also shows the number of bits per instruction for Dinero 1602, PDATS 1604, SBC 1606, and SCTC 1608 traces, if stream cache 712 in FIG. 7 has 128 ways and 8 sets, and FIFO replacement policy. Data FIFO buffer 712 has 4000 entries. The trace data generated by the mechanism of the present invention, SCTC 1608, require on average 29 times less bits per instruction for integer benchmarks and about 75 times less for floating point benchmarks than Dinero traces.

The trace data in 1608, generated by the mechanism of the present invention, outperforms PDATS on average 5 times for integer and 11 times for floating point benchmarks. Although the mechanism of the present invention in these illustrative examples uses a limited-size stream cache, this process produces traces not much larger than the SBC with the unlimited stream table. Because a stream cache index for 128×8 stream cache requires 10 bits, and an SBC stream table index is 2 bytes, SCTC traces can even have less bits per instruction than SBC.

FIG. 17 is a diagram illustrating table 1700, which contains a number of bits per instruction for different sizes of stream caches in accordance with a preferred embodiment of the present invention. In this example, table 1700 shows the number of bits per instruction for different sizes of stream caches in columns 1702, 1704, 1706, 1708, 1710, and 1712. In this example, the stream cache sizes are 64×4, 32×8, 128×4, 64×8, 265×4, and 128×8, respectively. Even with only 256 stream cache entries all floating-point applications except one require less than 2 bit/instruction, and half of the integer applications require less than 8 bit/instruction.

FIG. 18 is a diagram of graph 1800, which illustrates trace data sizes in accordance with a preferred embodiment of the present invention. In this example, the traces in graph 1800 show the number of bits per instruction when all considered traces are further compressed with a general compression algorithm such as gzip. Graph 1800 contains the following compressed traces: Dinero 1802, PDATS 1804, SBC 1806, and SCTC 1808. Traces for SCTC 1808 are generated using the mechanism of the present invention. As can be seen, the compression using the mechanism of the present invention is again only slightly worse than SBC, requiring less than 1 bit/instruction for most integer and less than 0.1 bit/instruction for most floating point benchmarks.

Thus, the present invention provides an improved method, apparatus, and computer instructions for compression of address traces. The mechanism of the present invention compresses instruction address traces and data address traces by replacing a stream of instruction addresses with a stream identifier and by relating data addresses to corresponding instructions in the stream that manipulate the data. In this manner, the mechanism of the present invention provides for improved compression of trace data in a manner that is suitable for hardware implementation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the instruction types for which data addresses are associated are load and store instructions, the mechanism of the present invention may be applied to any type of instruction that references or manipulates memory. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for compressing trace data in a trace that includes an instruction trace component and a data address trace component, the method comprising:

identifying an instruction stream;

responsive to identifying the instruction stream, replacing instruction addresses in the instruction stream with a stream identifier for reducing a size of the instruction trace component in the trace, wherein the stream identifier indicates an occurrence of the instruction stream and comprises a tag that includes a starting address for the instruction stream and a length of the instruction stream, and wherein compression occurs using fixed-size storage structures; and relating data addresses of memory locations accessed by selected instructions in the instruction stream to the selected instructions in the instruction stream to reduce a size of the data address trace component in the trace.

2. The method of claim 1 wherein relating data addresses of memory locations accessed by selected instructions in the instruction stream to the selected instructions in the instruction stream comprises storing the data addresses in a data address buffer.

3. The method of claim 1, wherein the selected instructions are at least one of load instructions and store instructions in the instruction stream.

4. The method of claim 1, wherein the data address trace component includes information about data strides and repetition counts for the data strides.

5. The method of claim 1, wherein compressed trace data includes a stream cache index trace, a stream cache miss trace, and a stream based data address trace.

6. The method of claim 1, wherein the identifying step and the replacing step are implemented in hardware.

7. The method of claim 6, wherein the hardware includes trace input buffers, a stream cache, a data address buffer, and a trace output controller.

8. The method of claim 7, wherein the stream cache comprises taken branch indicators.

9. The method of claim 1, wherein the fixed-size storage structures include an instruction stream cache and a data address buffer.

* * * * *